United States Patent [19]

Rodgers et al.

[11] 4,069,990
[45] Jan. 24, 1978

[54] RING-WING CANARD SPIN-UP CONTROL MECHANISM

[75] Inventors: Aubrey Rodgers, Huntsville; Rayburn K. Widner, Arab, both of Ala.

[73] Assignee: The United States of America as represented by the Secretary of the Army, Washington, D.C.

[21] Appl. No.: 777,372

[22] Filed: Mar. 14, 1977

[51] Int. Cl.² .............................................. F42B 13/00
[52] U.S. Cl. ..................................... 244/3.23; 74/5.1; 74/5.43; 308/DIG. 1
[58] Field of Search ............... 308/9, DIG. 1; 74/3.23, 74/5.1, 5.43, 5 R, 5.5, 5.7; 244/3.23, 3.16; 102/3

[56] References Cited

U.S. PATENT DOCUMENTS

| | | | |
|---|---|---|---|
| 3,430,499 | 3/1969 | Craig | 74/5.1 |
| 3,603,533 | 9/1971 | Stripling | 244/3.23 |
| 3,604,277 | 9/1971 | Stripling et al. | 74/5.7 |
| 3,667,301 | 6/1972 | Kent et al. | 74/5.1 |
| 3,807,239 | 4/1974 | Widner et al. | 74/5.7 |

*Primary Examiner*—Trygve M. Blix
*Assistant Examiner*—Charles E. Frankfort

*Attorney, Agent, or Firm*—Nathan Edelberg; Robert P. Gibson; Harold W. Hilton

[57] ABSTRACT

Apparatus of the present invention requires a very short spin-up wheel moment arm compared to a large wheel diameter. Such a requirement demands good wheel control during low rpm and excellent stability for high rpm in order to avoid uncontrollable wheel oscillations. Uncontrollable oscillations will prevent the wheel from either completing the spin-up cycle or it will destroy the gas bearing. Apparatus of the present invention uses a combination of a gas film bearing to control the alignment of the wheel during low rpm and a point contact configuration that uses the gyroscopic law of angular momentum to achieve wheel stability for the high rpm. The gyro law states that the angular momentum vector will precess into the torque vector. The spin-up control mechanism can be used to control and maintain stability of any wheel that has a large OD to small spin-up moment arm ratio requirement. An advantage of the structure of the present invention is that it utilizes the available angular momentum energy to capture and maintain wheel stability during the spin-up cycle. The higher the wheel rpm is, the better the control.

5 Claims, 2 Drawing Figures

RING-WING CANARD SPIN-UP CONTROL MECHANISM

BACKGROUND OF THE INVENTION

This invention relates to the field of missiles and more particularly to the flight control thereof. Apparatus of the present invention includes a ring wing canard spin stabilized for gyroscopic action to maintain the spin axis thereof in the trajectory of the missile despite disturbing wind forces that tend to cause rotation of the missile away from the canard spin axis.

SUMMARY OF THE INVENTION

Apparatus for controlling spin-up of a wheel which is secured to an element to impart spin thereto. The spin-up apparatus includes a stator secured to a stator housing and provided with an opening axially therethough which is in communication at one end thereof to a source of pressurized air. The other end of the axial opening communicates with a piston which is moveable to move a pin in engagement with a spherical radial surface in the interior of the wheel. A rotor secured to the wheel is disposed about the stator for spinning by air pressure impinging on buckets on the periphery of the rotor. An air bearing surface is provided between the rotor and stator and between a pair of flat surface rings. One of the flat surface rings is on a retractable piston secured to the stator housing. The second flat surface ring is the end surface of an annular member which encloses the rotor and stator and forms part of the wheel.

DESCRIPTION OF THE PREFERRED EMBODIMENT

Figures 1, 2:
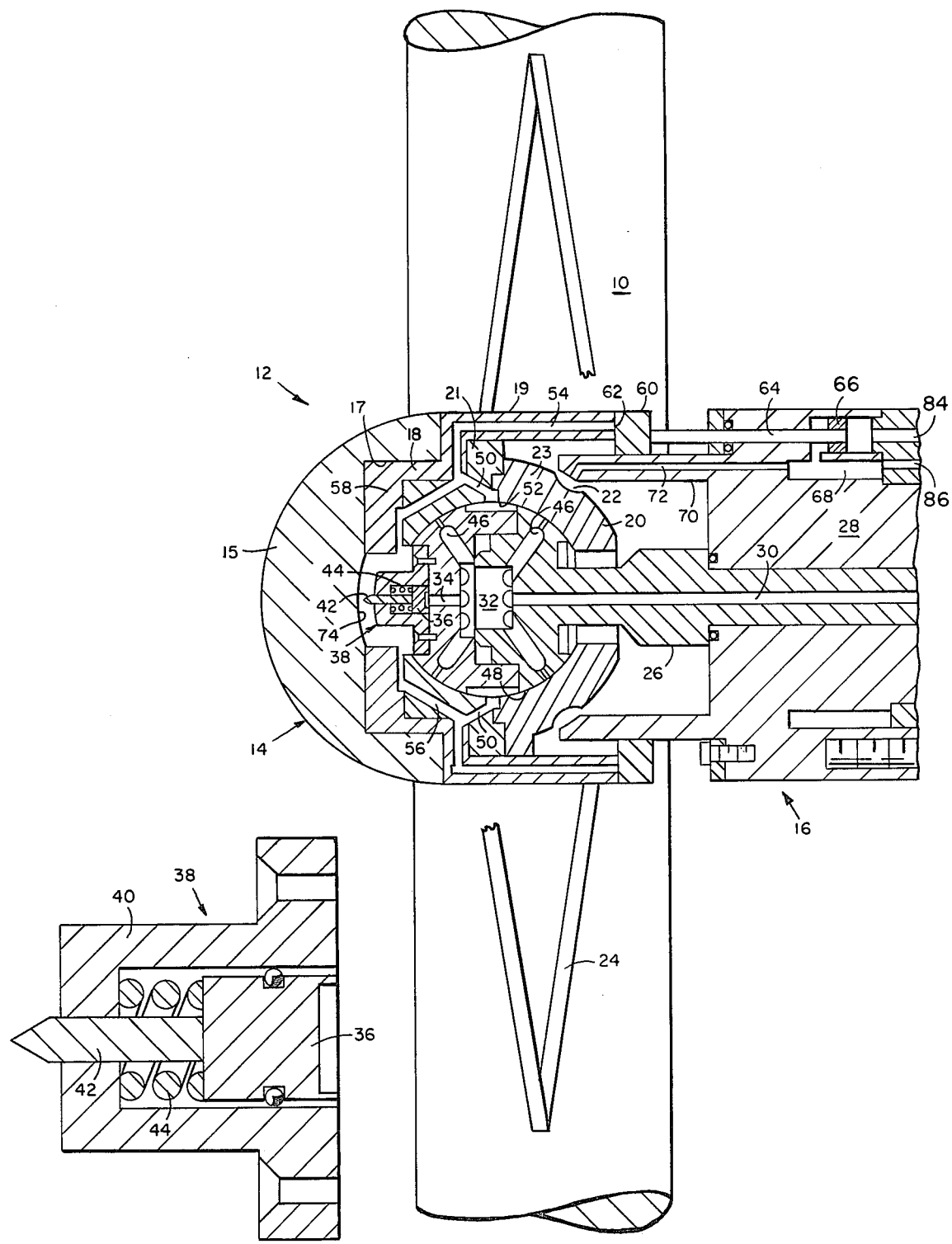
FIG. 1 is an elevational sectional view of the spin-up control apparatus connected to a ring wing canard.
FIG. 2 is an enlarged view of the piston and pin assembly of FIG. 1.

As shown in FIG. 1, a ring wing canard 10 is secured to a spin-up mechanism 12 which is disposed to impart spin to the ring wing canard. The spin-up mechanism includes a rotatable assembly 14 and a stationary assembly 16. The rotatable assembly 14 includes a forward spherical member 15 having a stepped inner surface 17. A member 18 having an annular outer portion 19 is threadably secured to surface 17 of member 15. A rotor 20 is disposed inside portion 19 of member 18 includes a forward section 21 threadably secured to member 18 and a second section 23 secured to section 19. Section 23 is provided with a plurality of spin-up buckets 22 around the periphery thereto. Annular outer portion 19 supports a plurality of struts 24 which are secured to the ring wing.

Stationary assembly 16 includes a stator 26 secured to a housing 28 and extending into the interior of rotor 20 for support thereof. A passage 30 extends axially through the stator and communicates into a manifold 32 in the interior of the stator. A restrictor 34 communicates with the manifold and with a piston 36 in an alignment assembly 38. Alignment assembly 38 (FIG. 2) includes the piston 36 in a housing 40. A pin 42 is secured to the piston and a spring 44 is disposed about pin 42 and seated between the housing and piston 36 to bias the piston rearwardly.

Stator 26 is further provided with radially extending passages or restrictors 46 (four shown) which communicate with manifold 32 and the outer surface 48 of the stator.

Rotor 20 is provided with a plurality of passages 50 (two shown) which communicate with the interior surface 52 thereof and with a plurality of exhaust passages 54 (two shown) disposed in member 18. Additional passages 56 (two shown) are provided in the forward portion 58 of member 21 and with exhaust passages 54. A ring member 60 is adjacent the end surface 62 of member 18 of the rotatable assembly. A plurality of piston rods 64 (one shown) is secured to a piston 66 in housing 28 and supports annular member 60.

An air manifold 68 disposed in housing 28 communicates with a source of air (not shown) through inlet 86. Housing 28 includes an extending arm portion 70 having a passage 72 therein which communicates with air manifold 68 and spin-up buckets 22.

In operation, air is directed through passage 30 to manifold 32. The air flows from manifold 32, through restrictor 34 and against piston 36 for forward movement thereof against the bias of spring 44. Pin 42 makes point contact with a spherical surface 74 in wheel 15. Air is also directed through passages 46, to form an air bearing between inner surface 52 of the rotor and inner surface 48 of the stator. Air also flows through passages 50, 56 and 54.

A separate source of air through passage 84 moves piston 66 and piston rod 64 so that surface 62 of annular member 60 is slightly spaced from surface 62 and an air bearing is formed therebetween, from air flowing through passages 54, and the rotor assembly is aligned in a plane with the spin-up nozzles.

The rotor is initially energized to low rpm by air from passages 72 impinging on buckets 22. Air through passage 84 is discontinued, allowing pressure from manifold 68 to retract ring surface 60 from surface 62. Pressure in manifold 68 and through passage 72 is increased to obtain desired wheel speed at which time this pressure is discontinued. Supply pressure through opening 30 is decreased to allow spring bias to overcome the pressure behind piston 36 to retract pin 42 from surface 74, the spin-up cycle is complete.

We claim:

1. Apparatus for imparting spin to a member comprising:
    a. a housing having a stator secured thereto, said stator having a chamber therein, an axial inlet for directing air to said chamber, an axial outlet for directing air axially out of said chamber, and, radially extending passages for directing air to the outer surface of said stator;
    b. a rotor disposed for rotation about said stator, said rotor having an inner surface adjacent said outer surface of said stator for providing an air bearing between said rotor and said stator in response to air flow from said chamber through said radially extending passages,
    c. a rotatable assembly secured to said rotor for rotation therewith, said assembly including a forward spherical portion and a rear cylindrical portion having passages therein in communication with the air between said stator and rotor and the distal edge of said cylindrical portion;
    d. spin-up nozzle means communicating with a second air source and with said rotor for impingment of air thereon for rotation thereof;

e. point contact means disposed for actuation by said air exhausting from said axial outlet to align said rotating assembly in a plane with said spin-up nozzles; and, f. caging means for caging and uncaging said rotating assembly responsive to rotation thereof.

2. Apparatus as in claim 1 wherein said point contact means includes a housing having a piston therein, a pin member projecting from said piston, a spring disposed about said pin member and seated against said piston and said housing for biased relation of said piston.

3. Apparatus as set forth in claim 2 including an inner spherical surface provided on said forward spherical member for seating said pin member thereagainst responsive to movement of said piston.

4. Apparatus as in claim 3 wherein said caging means includes an annular retractable member disposed adjacent said distal edge of said cylindrical portion of said rotating assembly, a piston rod secured to said annular member, a piston having said piston rod secured thereto and mounted in said stator housing for movement of said annular member responsive to actuation of said piston by a separate source of air.

5. Apparatus as set forth in claim 4 wherein said member having spin imparted thereto is a ring wing canard.

* * * * *